3,598,771
POLYURETHANE COMPOSITIONS PREPARED FROM POLYISOCYANATES AND PHENOL-ALDEHYDE RESINS

Billy D. Davis, Elvis E. Jones, and Roy E. Morgan, Jr., Lake Jackson, Tex., assignors to The Dow Chemical Company, Midland, Mich.
No Drawing. Filed Dec. 4, 1968, Ser. No. 781,260
Int. Cl. C08g 22/08, 22/26, 22/44
U.S. Cl. 260—2.5                         6 Claims

ABSTRACT OF THE DISCLOSURE

The invention concerns polyurethane resins and foams derived from phenol-aldehyde resins and polyisocyanates. It relates more particularly to non-burning polyurethane foams of novolac resins and polyisocyanates.

---

It is known to prepare polyurethane compositions, particularly polyurethane foams, from polyisocyanates and oxyalkylated derivatives of phenol-aldehyde resins, alone, or in admixture with other organic compounds containing at least two active hydrogen containing groups such as polyether polyols or polyesters.

The polyurethan compositions, especially the rigid foams have many desirable properties. The have great structural strength. In sandwich-type constructions they exhibit a high degree of rigidity, a property particularly suitable for building purposes. Because of the closed cell structure, or substantially closed cell of most rigid foams they are excellent heat and sound insulators.

Also, because of the many advantages of the polyurethane foams, industry is constantly searching for better components for use in the foam compositions, especially components that have the advantages of lower cost, or that will improve the foam properties, or enhance the resistance to burning, or render it self-extinguishing or non-burning.

It has now been discovered that polyurethane compositions prepared from phenol-aldehyde resins, in whole or in part, as the organic compound containing at least two active hydrogen containing groups as determined by the Zerewitinoff method, which are reacted with an organic polyisocyanate, has a surprising action of rendering the compositions more flame resistant, fire retardant, self-extinguishing or substantially non-burning without a substantial adverse affect to the physical properties.

The phenol-aldehyde or novolac resins to be employed in the invention are polynuclear compounds having the structure

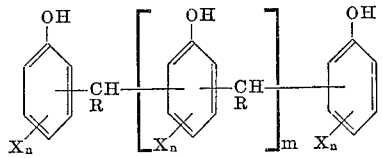

wherein R is hydrogen or an alkyl radical having from 1 to 3 carbon atoms, X is hydrogen, hydroxy, chlorine, bromine or an alkyl radical having from 1 to 12 carbon atoms, $n$ is an integer from 1 to 2 and $m$ is an integer from 0.1 to 4.

The novolac resins are prepared by condensing phenol or an ortho or para unsubstituted derivative thereof such as cresol, xylenol, resorcinol, chlorophenol, bromophenol, isopropylphenol, tert.-butylphenol, octylphenol, nonylphenol, dodecylphenol with the aldehyde in acidic solution at reaction temperatures between about 60 to 160° C. The novolac resins may contain from two to six aromatic rings per molecule, but preferably contain an average of from about 2.2 to 3.2 rings.

The aldehyde reactant can be formaldehyde, acetaldehyde, propionaldehyde or butyraldehyde, but is preferably formaldehyde, or its cyclic derivative, e.g. trioxane.

Suitable acidic catalysts for the novolac resin reaction are oxalic acid, zinc acetate, hydrochloric acid, sulfuric acid, or stannous octoate.

The reaction for making the novolac resin is carried out at temperatures between about 60° and 160° C. and at atmospheric pressure or thereabout employing the aldehyde in amount corresponding to from about 0.5 to 1.0 mole, preferably from 0.7 to 0.85 mole, per mole of the phenol initially used, and employing an acidic catalyst such as oxalic acid, zinc acetate, hydrochloric acid, or sulfuric acid.

The novolac resins can range from liquid to fusible organic solvent soluble solids, and as previously stated can be used in whole, or in part, as the component or hydroxyl-containing organic compound to react with an organic polyisocyanate to form polyurethane compositions possessing improved physical properties and self-extinguishing characteristics.

The novolac resins can be employed as the sole hydroxyl-containing compound, or they can be used in admixture or blended with polyether polyols such as the adducts of one or more alkylene oxides having from 2 to 4 carbon atoms such as ethylene oxide, propylene oxide, or butylene oxide, with glycols, glycerol, 1,2,4-butanetriol, 1,2,6-hexanetriol, trimethylolpropane, pentaerythritol, sucrose, hexose, or sorbitol, or with polyols that are adducts of said alkylene oxides and the novolac resins, e.g. novolac polyols, which polyols have hydroxyl numbers in the range of from about 30 to 1200. The novolac resins can also be blended or mixed with polyesters containing hydroxyl groups reactive with organic polyisocyanates to form polyester-novolac resin polyurethane compositions. The novolac resin may be used in amounts of from about 10 to about 100 percent by weight and preferably from about 40 to about 90 percent by weight based upon the total weight of material providing active OH groups.

Any organic aryl polyisocyanate can be employed in making the polyurethane compositions of the present invention. The isocyanate may contain two or more isocyanate radicals. Mixtures of the aryl polyisocyanates can be employed. Among representative polyisocyanate compounds are:

toluene-2,4-diisocyanate,
1,5-naphthalenediisocyanate,
cumene-2,4-diisocyanate,
4-methoxy-1,3-phenylenediisocyanate,
4-chloro-1,3-phenylenediisocyanate,
4-bromo-1,3-phenylenediisocyanate,
4-ethoxy-1,3-phenylenediisocyanate,
2,4'-diisocyanatodiphenylether,
5,6-dimethyl-1,3-phenylenediisocyanate,
2,4-dimethyl-1,3-phenylenediisocyanate,
4,4'-diisocyanatodiphenylether,
benzidinediisocyanate,
4,6-dimethyl-1,3-phenylenediisocyanate,
4,4'-diisocyanatodibenzyl
9,10-anthracenediisocyanate,
3,3'-dimethyl-4,4'-diisocyanatodiphenylmethane,
2,6'-dimethyl-4,4'-diisocyanatodiphenyl,
2,4-diisocyanatostilbene,
3,3'-dimethyl-4,4'-diisocyanatodiphenyl,
3,3'-dimethoxy-4,4'-diisocyanatodiphenyl,
1,4-anthracenediisocyanate,
2,5-fluorenediisocyanate,
1,8-naphthalenediisocyanate,
2,6-diisocyanatobenzfuran,
2,4,6-toluenetriisocyanate, and
2,4,4'-triisocyanatodiphenylether.

Other organic polyisocyanates that can be used are the polyisocyanates described in Canada Pat. No. 700,026 and in U.S. Patent No. 2,683,730; the phenyl indane diisocyanates which are described in U.S. Patent No. 2,855,385, the organic diisocyanates and the organic triisocyanates which are described in U.S. Patent No. 2,292,443; and the organic triisocyanates which are described in U.S. Patent No. 2,929,794.

The organic polyisocyanate compounds which can be used also include the isocyanate-terminated reaction products of an excess of any of the above described polyisocyanates with the polyhydroxy compounds described.

It may be mentioned that the polyurethane foams prepared from the novolac resins and blends of novolac resins and other polyols described herein and polymeric isocyanates such as polymethylene polyphenyl isocyanate (PAPI) possess superior resistance to burning and have better self-extinguishing characteristics than have foams made with the non-polymeric isocyanates e.g. tolylene diisocyanate, under otherwise similar conditions. The polyurethane foams prepared from the novolac resins and polymeric polyisocyanates are a preferred class of product.

In making the polyurethane foams of the invention, the proportions of the polyisocyanate compounds and the proportions of the novolac resin, or the novolac resin and the polyols or other compounds having active hydrogen atoms, can vary widely, but are usually employed in amounts corresponding to from about 0.85 to 2.0, preferably from 1.0 to 1.2 NCO group per active hydrogen atom in the mixture. One can provide water and excess polyisocyanate to form gases capable of expanding the reaction mass to make a foam. However, the polyurethane foams are preferably prepared employing aliphatic hydrocarbons boiling below 110° C. or halogenated aliphatic hydrocarbons boiling below 110° C. such as dichlorodifluoromethane, trichlorofluoromethane, hexane, hexene, or pentane as the blowing or foaming agent. Suitable foaming agents are disclosed in U.S. Patent No. 3,072,582.

The polyisocyanates are usually employed in an amount in excess of that theoretically required to react with the hydrogen atoms in the sum of the reactants and water in the mixture of materials, preferably in an amount corresponding to from about 1.0 to 1.2 NCO group for each OH and active hydrogen atom in the starting materials.

The polyurethane foams can be prepared by a prepolymer procedure, a one-shot process, or a batchwise technique, all of which methods are known to the art. The cellular products are rigid to semi-rigid foams and have closed or open cells, but usually consist of predominantly closed cells with a minor amount of open or interconnected cells.

In practice, the novolac resin or a mixture of the novolac resin and one or more other polyols or polyesters as hereinbefore described is reacted with a polyisocyanate in a typical urethane recipe. The recipe may employ a catalyst and oftentimes advantageously uses a plurality of catalysts such as an amine catalyst and a metal salt of an organic acid, and a cell regulating agent, together with an appropriate foaming agent such as $CH_2Cl_2$, $CCl_3F$, $CCl_2F_2$, $C_2Cl_2F_2$, $CH_2Cl_2$, $C_2H_4Cl_2$, $CHCl_2F$, $CClF_3$, and $CHClF_2$, or pentane, pentene, hexane, hexene, heptane and the like.

Among suitable catalysts are sodium acetate; amine catalysts such as tetramethylenediamine (TMDA), tetramethyl guanidine (TMG), tetramethyl-1,1,3,3-butanediamine (TMBDA), triethylenediamine ("DABCO"), triethylamine (TEA), dimethylethanolamine, tetramethylethylenediamine (TMEDA), and N-ethyl piperidine; and esters of tin, or tin salts, such as stannous oleate, stannous octoate, and dibutyl tin dilaurate. Mixtures or combinations of any two or more of the catalysts can also be used.

The catalysts can be used in amounts corresponding to from about 0.01 to 5 percent based on the total weight of the sum of the weights of the polyols or hydroxyl-containing compounds initially used.

Among surface active agents or emulsifiers there may be mentioned, polypropylene glycols having molecular weights between about 2000 and 8000, the liquid siliconeglycol copolymers having viscosities of from 350 to 3500 centistokes at 77° F. and polysiloxane polyoxyalkylene block copolymers as described in U.S. Patent No. 2,834,748.

The following examples illustrate ways in which the principle of the invention has been applied, but are not to be construed as limiting its scope.

EXAMPLE 1

(A) A novolac resin was prepared by adding a charge of 9200 pounds of phenol and 74 pounds of oxalic acid as catalyst, to a reaction vessel equipped with a stirrer and a short distilling column and condenser. The mixture was stirred and was heated to a temperature of about 100° C. A charge of 3600 pounds of aqueous 37 weight percent formaldehyde solution was added with stirring. The mixture was stirred and maintained at about 100° C. for a period of about one hour and 30 minutes. Thereafter, water was removed from the reaction vessel by azeotropic distillation with phenol by heating the reaction mixture at temperatures between about 100° and 140° C., and over a period of about 6 hours. The unreacted phenol was separated by distilling it from the product by heating the reacted mixture at temperatures of from about 155° C. up to about 160° C., at an absolute pressure of 0.5 inch of Hg, followed by dry steam stripping with 60 p.s.i.g. steam at about 160° C. for about 3 hours, followed by stripping at 0.5 in Hg at about 160° C. for about 2 hours to remove the water. The product was a novolac resin having an average molecular weight of 400. The product had the general formula

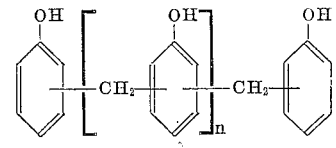

wherein $n$ has an average value of about 1.5.

(B) A novolac resin was prepared by procedure similar to that employed in part A above except that a lesser amount of formaldehyde was employed. The product was a novolac resin having the general formulas given in part A and wherein $n$ has a value of 0.3.

(C) A foam was prepared employing the recipe:

| Ingredient: | Parts by weight |
|---|---|
| Novolac resin [1] (3.5) | 173.0 |
| Novolac resin [2] (2.3) | 173.0 |
| Polymethylene polyphenyl isocyanate "PAPI" | 454.0 |
| Silicone surfactant | 4.0 |
| Pyridine | 2.0 |
| Trichlorofluoromethane | 144.0 |
| Tris(chloroethyl) phosphate | 120.0 |

[1] A solid novolac resin prepared by reacting a mixture corresponding to 2 moles of phenol and 1 mole of formaldehyde. The resin had a functionality of 3.5, a mol. wt. of about 250, and an OH equivalent weight of about 102.
[2] A solid novolac resin prepared by reacting a mixture of 4.5 moles of phenol and 1 mole of formaldehyde. The resin had a functionality of 2.3, a mol. wt. of about 230, and an OH equivalent weight of 101.

The ingredients, except the polyisocyanate were mixed with one another and blended into a uniform mass. Thereafter the polymethylene polyphenyl isocyanate ("PAPI") was added. The resulting mixture was vigorously stirred for 10 seconds, then was poured into a corrugated paper box and allowed to foam. The product was a light brown colored rigid foam composed of extremely fine cells. It had a density of 1.99 lbs./cu. ft. The foam had a K value of 0.110, abrasion loss of only 4.1%, a compression yield strength of 35.6 lbs./sq. in. and a fire retardance by ASTM D1692–59T of burned 0.39 inch in 36 seconds.

EXAMPLE 2

In each of a series of experiments, a blend of the novolac resin prepared in part B of Example 1 and a novolac polyol prepared by reacting approximately one mole of propylene oxide with each OH group in the novolac resin prepared in part A of Example 1 was used to prepare a polyurethane foam in a recipe and procedure similar to that employed in Example 1. The recipe employed was as follows:

| Ingredient: | Parts by weight |
|---|---|
| Novolac Resin A polyol (3.5) | Variable |
| Novolac Resin B (2.3) | Do. |
| Polymethylene polyphenyl isocyanate "PAPI" | Do. |
| Trichlorofluoromethane | 144 |
| Silicone surfactant | 8 |
| Triethylenediamine | 1.2 |
| Tris(chloroethyl) phosphate | 120 |

The ingredients were blended ttogether with vigorous stirring for about ten seconds. The stirred mixture was poured into a cardboard container and was allowed to foam. Test pieces were cut from the foam and were used to determine the density. Other test pieces of the foam ¾ x ¾ inch by 10 inches long were used to determine a burning or flame-retardant characteristics. The procedure for determining the burning characteristic was to support a weighed ¾ x ¾ inch square test piece of the foam in a vertical position within a 2¼ x 2⅛ inch internal cross-section metal tube 12 inches long (a chimney). A microburner flame 1 to 1¼ inches tall is held under the lower end of the foam for ten seconds to ignite the same, then is removed. The test piece either burns or is self-extinguished. If the test piece of foam is self-extinguished, it is removed and re-weighed. The loss in weight is a measure of the burning characteristic of the foam. The lower the loss in weight, the lesser is the burning. Table I identifies the experiments and gives the parts by weight of novolac resin A polyol, novolac resin B and polymethylene polyphenyl isocyanate "PAPI" used in making the polyurethane foams. The table also gives the density of the foam and the loss in weight after subjecting it to the chimney burning test.

TABLE I

| | Starting materials, gms. | | | Foam product | |
|---|---|---|---|---|---|
| Run No. | Novolac resin B | Novolac resin A polyol | Polyisocyanate | Density, lbs./cu. ft. | Burning test, loss in wt. percent |
| 1 | 356 | 0 | 444 | 1.95 | 9.6 |
| 2 | 315 | 54 | 431 | 2.22 | 10.8 |
| 3 | 231 | 156 | 413 | 2.26 | 13.4 |
| 4 | 158 | 246 | 395 | 2.27 | 18.9 |
| 5 | 91 | 330 | 379 | 2.15 | 20.7 |
| 6 | 58 | 368 | 374 | 1.72 | ¹ 26.5 |
| 7 | 0 | 444 | 356 | 1.88 | ¹ 28.5 |

¹ These foams were made using only 60 parts by weight of tris(chloroethyl)phosphate.

EXAMPLE 3

A polyurethane foam was prepared from a novolac resin similar to that prepared in part B of Example 1 and a polyisocyanate employing the recipe:

| Ingredients: | Parts by weight |
|---|---|
| Novolac resin ¹ | 356 |
| Polyethlene polyphenylcyanate (Kaiser NCO-20) | 444 |
| Silicone surfactant | 8 |
| Tris(chloroethyl)phosphate | 120 |
| Trischlorofluoromethane | 144 |
| Sodium acetate (catalyst) | 32 |

¹ See Example 1.

The ingredients, except the isocyanate, were uniformly mixed with the hot novolac resin heated at 100° C., in a Waring Blendor, then the isocyanate was added. The resulting mixture was stirred for about 10 seconds, then was poured into an open cardboard container and allowed to foam. The cream time was 30 seconds. The foam time was 100 seconds. The product was a light brown colored rigid foam composed of uniform closed cells. The foam had the properties:

Density—1.95 lbs./cu. ft.
Compression strength—33.8 lbs./sq. in.
Heat distortion temp.—125–130° C.
MVT—1.58 perm. inches
K factor (original)—0.108
Abrasion loss—9.8 percent
Humidity ageing (28 days)—0.0 percent
Burning (ASTM D1692–59T)—0.3 in./39 sec.
Burning (chimney test)—9.6 percent loss

EXAMPLE 4

A polyurethane foam was prepared from a novolac resin similar to that prepared in part A of Example 1 and a polyisocyanate employing the recipe:

| Ingredients: | Parts by weight |
|---|---|
| Novolac resin | 356 |
| Polymethylene polyphenyl isocyanate (Kaiser NCO-20) | 444 |
| Silicone surfactant | 8 |
| Triethyl phosphate | 120 |
| Trichlorofluoromethane | 144 |
| N-ethyl piperidine (catalyst) | 0.8 |

The procedure was similar to that employed in Example 3. The cream time was 10 seconds. The foaming time was 56 seconds. The foam product had the properties:

Density—2.11 lbs./cu. ft.
Compression strength—35.3 lbs./sq. in.
MVT—2.89 perm. inches
K factor (original)—0.105
Abrasion loss—3.9 percent
Humidity ageing (28 days)—6.6 percent
Burning (ASTM D1692–59T)—0.3 in./46 sec.
Burning (chimney test)—9.8 percent

EXAMPLE 5

In each of a series of experiments, a polyurethane foam was prepared by reacting a novolac resin having a functionality of 2.3 and similar to that employed in Example 2, with a polyisocyanate in the presence of various kinds and amounts of materials as catalysts and employing the recipe.

| Ingredients: | Parts by weight |
|---|---|
| Novolac resin | 356 |
| Polyisocyanate (Kaiser NCO-20) | 444 |
| Triethylphosphate | 120 |
| Trichlorofluoromethane | 144 |
| Silicone surfactant | 8 |
| Catalyst | Variable |

The ingredients, except the isocyanate and trichlorofluoromethane were mixed with one another at a temperature of about 100° C. and blended into a uniform mass. The trichlorofluoromethane was added while cooling the mixture to room temperature after which the polyisocyanate was added. The resulting mixture was rapidly blended and was poured into a paper box mold and allowed to foam. The foam was cured for 30 minutes at 70° C. Table II identifies the experiments and names the compound and gives the amount of the same used as catalyst for the reaction. The table also gives the cream time and the foaming time for the reaction. The table gives the properties determined for the foam.

only 0.5 gram molecular proportion of the propylene oxide for each OH group in the novolac resin. The reaction

TABLE II

| Run No. | Catalyst Kind | Catalyst Gms. | Cream time, sec. | Foam time, sec. | Density, lbs./cu. ft. | Comp. yield, p.s.i. | K factor | Chimney burning test, weight loss percent |
|---|---|---|---|---|---|---|---|---|
| 1 | Sodium acetate | 2 | 50 | 180 | 2.29 | 34.7 | 0.114 | 16.3 |
| 2 | do | 3.6 | 15 | 80 | 2.04 | 33.2 | 0.115 | 16.3 |
| 3 | Triethylamine | 0.8 | 17 | 70 | 2.41 | 36.6 | 0.110 | 16.3 |
| 4 | Triethylenediamine | 1.2 | 30 | 105 | 2.29 | 41.1 | 0.110 | 15.8 |
| 5 | do | 1.6 | 20 | 75 | 2.17 | 37.3 | 0.107 | 15.8 |
| 6 | Tetramethylbutanediamine | 0.8 | 30 | 220 | 2.40 | 31.0 | 0.111 | 14.0 |
| 7 | do | 1.2 | 18 | 75 | 2.22 | 38.1 | 0.111 | 15.0 |
| 8 | N-ethylpiperidine | 1.2 | 10 | 56 | 2.11 | 35.3 | 0.105 | 9.8 |
| 9 | Pyridine | 4.8 | 50 | 270 | 2.52 | 42.3 | 0.153 | 9.4 |

EXAMPLE 6

A polyurethane foam was prepared from a mixture of a novolac resin of 2.3 functionality similar to that prepared in part B of Example 1 and a polyether polyol consisting of the adduct of propylene oxide and sucrose, which adduct had an OH equivalent weight of 150, and a polyisocyanate employing the recipe:

Ingredients: Parts by weight
Novolac resin _____ 21
Polyether polyol _____ 29.6
Polyisocyanate (Kaiser NCO-20) _____ 52.4
Silicone surfactant _____ 1
Tris(chloroethyl)phosphate _____ 10
Trichlorofluoromethane _____ 22
Sodium acetate (catalyst) _____ 1

The procedure was similar to that employed in Example 3. The foam product was composed of substantially uniform closed cells and had a density of 2.05 lbs./cu. ft. In a fire retardance test by ASTM D1692-59T the foam burned only 0.53 inch in 35.9 seconds, then self-extinguished.

EXAMPLE 7

A polyurethane foam was prepared from a mixture of a novolac resin similar to that prepared in part B of Example 1 and a polyether polyol that was the adduct of propylene oxide and a mixture of equal parts by weight of sucrose and glycerine which polyol had an OH equivalent weight of about 490, and a polyisocyanate employing the recipe:

Ingredients: Parts by weight
Novolac resin _____ 22.4
Polyether polyol _____ 21.0
Polyisocyanate (Kaiser NCO-20) _____ 50.0
Silicone surfactant _____ 0.93
Tris(chloroethyl)phosphate _____ 5.0
Trichlorofluoromethane _____ 18.0
Sodium acetate (catalyst) _____ 1.0

The procedure was similar to that employed in Example 3. The foam product had a density of 2.08 lbs./cu. ft. and was of uniform fine cells. In a burning test ASTM D1692-59T the foam burned 0.64 inch in 35.4 seconds, then self-extinguished.

Density—2.22 lbs./cu. ft.
Compression yield strength—34.5 lbs./sq. in.
Heat distortion temperature—95-100° C.
MVT—2.81
K factor (original)—0.118
Abrasion loss—15.6 percent
Humidity ageing (28 days)—9.8 percent
Burning (ASTM 1692-59T)—0.6 in/39 sec.
Burning (chimney test)—22 percent loss

EXAMPLE 8

A novolac resin polyol was prepared by reacting propylene oxide with a novolac resin similar to that prepared in part B of Example 1, in an amount corresponding to only 0.5 gram molecular proportion of the propylene oxide for each OH group in the novolac resin. The reaction product had an OH equivalent weight of about 140. A polyurethane foam was prepared by reacting said novolac resin polyol with a polyisocyanate employing the recipe:

Ingredients: Parts by weight
Novolac resin polyol _____ 415
Polyisocyanate "PAPI" _____ 385
Silicon surfactant _____ 8
Trichlorofluoromethane _____ 144
Triethylphosphate _____ 120
Triethylenediamine _____ 1.2
Stannous octoate _____ 1.2

The procedure was similar to that employed in Example 3. The foam product was composed of substantially uniform closed cells and had a density of 2.05 lb./cu. ft. In a fire retardance test by ASTM D1692-59T the foam burned only 0.53 inch in 35.9 seconds, then self-extinguished.

EXAMPLE 9

A polyurethane foam was prepared by reacting a novolac resin, prepared from para-tert.-butylphenol and formaldehyde employing procedure similar to that employed in part B of Example 1, in which the tert.-butylphenol formaldehyde resin had a functionality of 2.0 and a molecular weight of 310, with a polyisocyanate using the recipe:

Ingredients: Parts by weight
Novolac resin _____ 27.5
Polyisocyanate ("Mondur MR") _____ 22.5
Silicone surfactant _____ 1.0
Triethyl phosphate _____ 7.5
Trichlorofluoromethane _____ 10.0
Triethylenediamine _____ 1.0
Ethylene glycol _____ 1.0

The foam product had a density of 2.17 lbs./cu. ft. The foam burned 0.7 inch in 26.5 seconds then self-extinguished by ASTM 1692-59T test.

EXAMPLE 10

A novolac resin was prepared by reacting phenol with n-butyraldehyde employing procedure similar to that employed in part B of Example 1. The novolac resin had a functionality of 2.23 and a molecular weight of 270. A polyurethane foam was prepared from the novolac resin and a polyisocyanate using the recipe:

Ingredients: Parts by weight
Novolac resin _____ 125
Polyisocyanate (Kaiser NCO-20) (0.85 index) _ 111
Silicone surfactant _____ 4.6
Tris(chloroethyl)phosphate _____ 35.5
Trichlorofluoromethane _____ 52.0
Triethylenediamine [1] _____ 0.7

[1] A 50 weight percent solution of triethylenediamine in ethylene glycol.

The procedure was similar to that employed in Example 3. The foam product had a density of 2.06 lb./cu. ft. A chimney burning test showed a weight loss of 35 percent.

EXAMPLE 11

A polyurethane foam was prepared from a resorcinol-formaldehyde novolac resin having a functionality of 2.3 and a polyisocyanate employing the recipe:

| Ingredients: | Parts by weight |
|---|---|
| Novolac resin | 30 |
| Polyisocyanate | 20 |
| Silicone surfactant | 2 |
| Tris(chloroethyl)phosphate | 25 |
| Trichlorofluoromethane | 14 |
| Triethylenediamine | [1] 0.7 |

[1] A 50 weight percent solution of triethylenediamine in ethylene glycol.

The procedure was similar to that employed in Example 3. The foam product had a density of 3.7 lb./cu. ft. In a fire retardance test by ASTM 1692–59T the foam burned only 0.42 inch in 43.2 seconds, then self-extinguished.

EXAMPLE 12

A charge of 200 parts by weight of a novolac resin similar to that prepared in part B of Example 1 and having an OH functionality of 2.3 was mixed with 200 parts by weight of methylene chloride ($CH_2Cl_2$), and 220 parts of water. The mixture was stirred and maintained at temperatures between 2° and 20° C. while adding thereto about 212 parts by weight of bromine chloride (BrCl). Thereafter, the aqueous and organic layers were separated. The organic layer was washed with water. The product was recovered by heating the organic layer under such atmospheric pressure while distilling volatile solvent and ingredients from the residue. The product was recovered as brominated novolac resin. It contained 38.3 percent by weight of bromine. A polyurethane foam was prepared from the brominated novolac resin and a polyisocyanate employing the recipe:

| Ingredient: | Parts by weight |
|---|---|
| Brominated novolac resin | 108 |
| Polyisocyanate (Kaiser NCO–20) | 100 |
| Silicone surfactant | 4 |
| Triethyl phosphate | 30 |
| Trichlorofluoromethane | 30 |
| Sodium acetate | 1 |

The procedure employed was similar to that employed in Example 3. The foam product was cured for 1 hour at 60° C. The foam was of uniform fine cells and had a density of 3.70 lbs./cu. ft. A fire retardant test by ASTM D1692–69T showed the foam to burn only 0.2 inch in 42.5 seconds.

Chlorinated novolac resins or novolac resins prepared from mono-, and dichloro-, or mono- and dibromo-phenol can be employed in place of the brominated novolac resin used in the example, to make polyurethane foams of superior flame-proof properties.

EXAMPLE 13

A polyurethane foam was prepared from a novolac resin similar to that prepared in part B of Example 1, and a polyisocyanate employing the recipe:

| Ingredient: | Parts by weight |
|---|---|
| Novolac resin (2.3) | 300 |
| Polymethylene polyphenyl isocyanate | 393 |
| Silicone surfactant | 6.5 |
| Trichlorofluoromethane | 48 |
| 1,1-dichloroethane | 50 |
| Pyridine | 9 |

The novolac resin was heated to 100° C. Thereafter, the silicone surfactant, the trichlorofluoromethane, the 1,1-dichloroethane and the pyridine were added while stirring the mixture. The resulting mixture was blended with the polymethylene polyphenyl isocyanate in a Waring Blendor at 2700 r.p.m. for 8 seconds, then was poured into an open paperboard mold 12½ x 12½ inches square by 9 inches deep and allowed to foam. The foam was cured for 12 hours at 72° C. The cured foam had the properties as follows:

Density—2.09 lbs./ cu. ft.
K value—0.134
Compression strength—26.1 lbs./sq. in.
Abrasion loss—2 percent
MVT—0.71 perm. inches
Closed cells—98 percent
Burning (chimney test)—17.5% wt. loss
Burning (penetration test) [1]—>30 minutes

[1] Bureau of Mines, "Flame Penetration Automated Test," see Journal of Cellular Plastics. vol. 4, No. 3, pages 102–108 (1968).

EXAMPLE 14

A polyurethane foam was prepared from a novolac resin similar to that prepared in part B of Example 1 and a polyisocyanate employing the recipe:

| Ingredient: | Parts by weight |
|---|---|
| Novolac resin (2.3) | 30 |
| Polymethylene polyphenyl isocyanate (2.0 index) | 75.6 |
| Polypropyleneglycol (4000 mol. wt.) | 4.5 |
| Silicone surfactant | 4.5 |
| Triethylphosphate | 15 |
| Trichlorofluoromethane | 16 |
| Triethylenediamine | 0.5 |
| Dibutyl tin dilaurate | 1.0 |

The ingredients were blended together using procedure similar to that employed in Example 13. The foam was cured at 70° C. for 12 hours. The foam had the properties:

Density—1.95 lbs./cu. ft.
K value—0.147
Compression strength—18.8 lbs./sq. in.
Heat distortion temp.—105–110° C.
Abrasion loss—5 percent
Burning (chimney test)—16% wt. loss

EXAMPLE 15

Polyurethane foams were prepared from a novolac resin similar to that prepared in part B of Example 1 and a polyisocyanate employing the recipe:

| Ingredient: | Parts by weight |
|---|---|
| Novolac resin (2.3) | 21 |
| Polymethylene polyphenyl isocyanate | 26.2 |
| Surfactant (non-ionic ether ester) | Variable |
| Triethylphosphate | 7 |
| Trichlorofluoromethane | 10 |
| Sodium acetate (catalyst) | 0.5 |

The ingredients except for the trichlorofluoromethane and the polymethylene polyphenyl isocyanate, were blended with the hot 100° C. novolac resin. Thereafter, the trichlorofluoromethane was added while cooling the resulting mixture to about room temperature. The isocyanate was then added with rapid mixing until creaming was observed. The mixture was then poured into a paper cup mold and allowed to foam. The foams were cured at 70° C. for 30 minutes. Table III identifies the experiments and gives the parts by weight of surfactant employed in the experiment. The table also gives the density of the foam and the percent of open cells and of closed cells therein as determined by test.

TABLE III

| Run No. | Surfactant, parts | Foam product | | |
|---|---|---|---|---|
| | | Density, lbs./cu. ft. | Closed cells, percent | Open cells, percent |
| 1 | None | 2.87 | 3 | 97 |
| 2 | 0.25 | 2.58 | 64.2 | 35.8 |
| 3 | 0.5 | 2.35 | 80.5 | 19.5 |
| 4 | 0.75 | 2.35 | 89.0 | 11.0 |
| 5 | 1.5 | 2.05 | 96.0 | 4.0 |

The open cell foam of Run No. 1 in Table III had the properties as follows

Density—2.87 lbs./cu. ft.
Compression yield strength—20.9 lbs./sq. in.
MVT—11.88 perm inches
Humidity ageing (21 days)—6.4 percent
Open cells—97 percent All of the foams were self-extinguishing by ASTM 1692–59T test.

EXAMPLE 16

A polyurethane foam was prepared from a novolac resin similar to that prepared in part B of Example 1 and a polyisocyanate using a recipe similar to that used in Run No. 5 of Example 15 and as follows:

Ingredients: Parts by weight
Novolac resin 2.3 _____ 356
Polyisocyanate (Kaiser NCO–20) _____ 444
Surfactant (non-ionic ether ester) _____ 24
Trichlorofluoromethane _____ 160
Sodium acetate _____ 3.2

The ingredients were blended together employing procedure similar to that employed in Example 15. The foam was cured for 30 minutes at 70° C. The foam product had the properties as follows:

Density—1.88 lbs./cu. ft.
Compression yield strength—21.1 lbs./sq. in.
MVT—5.16 perm inches
K factor (original)—0.136
Humidity ageing—6.7 percent The foam was self-extinguishing by ASTM 1692–59T test.

We claim:
1. A foamed polyurethane product which comprises the reaction product of (1) a hydroxyl containing composition containing from about 10 to about 100 percent by weight of a novolac resin having the general structure

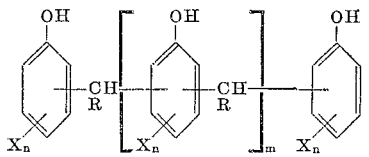

wherein R is hydrogen or an alkyl radical having from 1 to 3 carbon atoms, X is hydrogen, hydroxyl, chlorine, bromine, or an alkyl radical having from 1 to 12 carbon atoms, $n$ is an integer from 1 to 2 and $m$ is an integer from 0.1 to 4, and 0 to 90 percent by weight of a hydroxyl containing material selected from the group consisting of a polyether polyol and polyester polyol, and (2) an organic polyisocyanate, said product being formed in the presence of a blowing agent selected from the group consisting of water, volatile hydrocarbons boiling below 110° C. and halohydrocarbons boiling below 110° C., an emulsifying agent, and a catalyst for urethane formation, said polyisocyanate being used in proportions corresponding to from about 0.85 to 2.0 NCO group for each OH and active H atom in the mixture of reactive materials.

2. A foamed polyurethane product as claimed in claim 1 wherein the polyisocyanate is used in proportions corresponding to from about 1.0 to 1.2 NCO groups for each OH and active H atom.

3. A foamed polyurethane product as claimed in claim 1 wherein hydroxyl containing composition contains from about 40 to about 90 percent by weight of the novolac resin and from about 10 to about 60% by weight of a hydroxyl containing material selected from a polyether polyol and a polyester polyol.

4. A foamed polyurethane product as claimed in claim 1 wherein X is hydrogen and R is hydrogen.

5. A foamed polyurethane product as claimed in claim 1 wherein the blowing agent is trichlorofluoromethane.

6. A foamed polyurethane product as claimed in claim 1 wherein the polyisocyanate is polymethylene polyphenylisocyanate.

References Cited

UNITED STATES PATENTS

| 2,349,756 | 5/1944 | Pratt | 260—57 |
| 2,374,136 | 4/1945 | Rothrock | 260—22 |
| 2,608,536 | 8/1952 | Sterling | 260—2.5 |
| 2,645,623 | 7/1953 | Hermann | 260—19 |
| 3,061,559 | 10/1962 | Henson et al. | 260—2.5 |
| 3,409,579 | 11/1968 | Robins | 260—30.4 |
| 3,422,165 | 1/1969 | Brotherton et al. | 260—859 |
| 3,194,773 | 7/1965 | Hostettler | 260—2.5 |

FOREIGN PATENTS

| 934,629 | 8/1963 | Great Britain | 260—2.5 |

OTHER REFERENCES

Product Report entitled "Papi," Bulletin of Upjohn Company, page 1, received in Group 140 on Jan. 30, 1967.

Technical Bulletin 101 of The Upjohn Company, page 1 and the front cover cited, received in Group 140 on Jan. 30, 1967.

DONALD E. CZAJA, Primary Examiner

C. W. IVY, Assistant Examiner

U.S. Cl. X.R.

106—15; 117—137; 260—47, 59, 838, 842, 858